(12) United States Patent
Witt

(10) Patent No.: US 6,742,558 B1
(45) Date of Patent: Jun. 1, 2004

(54) ROUTER HOLDING DEVICE

(75) Inventor: Bradley R. Witt, Davenport, IA (US)

(73) Assignee: Witt Family Partnership, L.P., Durant, IA (US)

( * ) Notice: Subject to any disclaimer, the term of this patent is extended or adjusted under 35 U.S.C. 154(b) by 20 days.

(21) Appl. No.: 10/437,472

(22) Filed: May 14, 2003

(51) Int. Cl.$^7$ .............................. B27F 7/00; B27C 5/00; B27C 9/00
(52) U.S. Cl. .................... 144/353; 144/48.6; 144/135.2; 144/154.5; 29/525.11; 409/182
(58) Field of Search ........................... 144/48.6, 136.95, 144/137, 154.5, 371, 135.2, 329, 344, 345, 353; 409/182; 33/197; 29/428, 446, 525.11; 156/219, 222, 297, 299, 634

(56) References Cited

U.S. PATENT DOCUMENTS

| | | | |
|---|---|---|---|
| 4,102,370 A | | 7/1978 | Vess |
| 4,143,691 A | | 3/1979 | Robinson |
| 4,484,608 A | * | 11/1984 | Ferdinand et al. ....... 144/135.2 |
| 5,345,986 A | | 9/1994 | Kieffer |
| 5,772,368 A | * | 6/1998 | Posh ........................... 409/182 |
| 5,983,968 A | | 11/1999 | Newman |
| 6,138,726 A | | 10/2000 | Newman |
| 6,179,718 B1 | | 1/2001 | Morath et al. |
| 6,318,936 B1 | | 11/2001 | McFarlin, Jr. et al. |

* cited by examiner

*Primary Examiner*—W. Donald Bray
(74) *Attorney, Agent, or Firm*—McKee, Voorhees & Sease, P.L.C.

(57) ABSTRACT

A holding device for holding a tool includes a holding block having a central opening formed from a stack of laminated members secured together. The block includes holes extending away from the central opening. A pair of support plates are secured to the block and are secured at right angles to one another. Key hole slots are in one of the support members and have a first bore containing a slug and a second bore at right angles thereto. A threaded member extends through the other of the support members, through the second bore, and is threaded into the slug within the first bore.

25 Claims, 5 Drawing Sheets

ROUTER HOLDING DEVICE

BACKGROUND OF THE INVENTION

The present invention relates to a tool holding device and method for making same. While the invention has application specifically to a device for holding a router, the invention may be adapted for holding numerous other tools or objects as well.

Various types of tool holding devices have been employed in the past. One example of these devices is a holder for a router, which enables the router to be used as a fixed tool so that the work piece can be moved relative to the router bit. In the past, a thick block has been provided which holds the tool. The block is required to be quite thick, sometimes as much as two inches. The block includes an opening in the center, and numerous axial bores extending parallel to the direction of the axis of the opening. In addition, radial bores are often provided from the central opening, extending outwardly to the outer edge of the block. When the block was constructed of a single piece, the machining of these various bores was time consuming and costly in terms of man hours expended and in terms of raw material costs.

Another problem encountered with prior art devices is the ability to attach the block to a horizontal base plate. Usually this is accomplished with upstanding support plates which are spaced apart from one another and which are attached to opposite sides of the block. These spaced apart support plates sometimes fail to hold the block rigidly. Any flexing or movement of the vertical members is disadvantageous because it allows the router (or other tool) to shift in its horizontal position.

Another problem is obtaining firm attachment of the various members of the holding device together. In prior devices, an aluminum angle was used to attach the various components together. For example, an aluminum angle was used to attach the upstanding support plates to the base plate. This prior method was time consuming and costly in terms of man hours expended and parts cost.

Therefore a primary object of the present invention is the provision of an improved tool holding device and method for making same.

A further object of the present invention is the provision of an improved tool holding device which utilizes a laminated block having various layers of laminates therein.

A further object of the present invention is the provision of a thick block comprising various laminations, with radial bores being formed in the laminations before they are assembled in the laminated thick block.

A further object of the present invention is the provision of an improved method for supporting the block, utilizing support plates that are at right angles to one another and are attached to one another and the base plate.

A further object of the present invention is the provision of vertical support plates at right angles to each other so as to permit vertical motion of the block relative to the support blades, but so as to achieve a degree of stability and accuracy required to allow vertical linear motion to take place and still hold the tool in the same relative horizontal position.

A further object of the present invention is the provision of an improved means for attaching first and second members together.

A further object of the present invention is the provision of an improved means for attaching a first member having a key hole slot therein and a slug within the key hole slot to a second member having a threaded elongated member extending there through and threaded into the slug of the first member.

A further object of the present invention is the provision of an improved holding device and method for making same which is economical to manufacture, efficient in operation, and durable in use.

SUMMARY OF THE INVENTION

The foregoing objects may be achieved by a holding device adapted to selectively retentively hold an object. The holding device comprises a plurality of laminate members each having a first flat surface, a second flat surface parallel to the first flat surface, a parametric edge, a central opening extending through each of the laminate members in a direction perpendicular to the first and second flat surfaces, and a slot extending completely through the laminate member from the central opening to the parametric edge so as to create a first laminate side and a second laminate side spaced apart from one another across the slot. Securing means hold the plurality of laminate members together in a stack to form a laminate block having a central block opening formed by the central openings of the plurality of laminate members being registered with one another and having a block slot formed by the slots of the plurality of laminate members being registered with one another. Securing means may include rivets, bolts, screws or other mechanical devices. The securing means may also include adhesive for attaching the various laminate members together. The securing means also may include bonding of the adjacent laminate members together by the application of heat or chemicals.

The block slot forms a first block side and a second block side spaced apart from one another across the block slot. The central block opening includes a shape and size that corresponds generally to the object being held so as to permit the object to be fitted within the block opening of the laminated block.

A tightening member engages the first and second block sides and is moveable to cause flexing of the laminated block from a loose position permitting the object to move within the registered openings of the laminated block to a tight position moving the opposite sides of the block stop closer together to clamp the laminated block around the object and hold the object against movement relative to the laminated block.

According to another feature of the present invention, the laminated block includes one or more axial holes extending perpendicular to the first and second flat surfaces of the plurality of laminate members.

According to another feature of the present invention, the laminated block comprises one or more radial holes extending parallel to the first and second flat surfaces of the plurality of laminate members.

According to another feature of the present invention, the one or more radial holes each comprise a first partial hole formed in one of the plurality of laminate members and a second partial hole formed in another of the plurality of laminate members. The first and second partial holes are registered with one another to combine to form a single one of the one or more radial holes.

According to another feature of the present invention, the block is held between first and second support members attached to a base plate and attached to one another at right angles.

According to another feature of the present invention, the support members are attached to the base plate by first and second securing holes that are perpendicular to one another. They are in communication with one another also, and a slug is positioned within the first securing hole. A threaded member extends through the base plate and the second securing hole and is threaded into the slug to attach the base plate to the support member.

The method of the present invention comprises forming a plurality of laminated plates such as described above. The method further comprises attaching the laminate members together in face to face relation with the central openings registered and with the slots of the laminated members also registered with one another. This forms a laminated block having a central block opening and a block slot separating first and second block ends spaced apart from one another across the block slot. The method further includes engaging the first block end and the second block end with a tightening member capable of moving from a loose position to a tightened position flexing the first block end and the second block end towards one another to reduce the size of the block opening.

The method further comprises attaching a first support plate and a second support plate to a base plate and attaching the first support plate to the second support plate at right angles to one another.

According to another feature of the present invention the step of attaching the first and second support members to the base plate comprises forming a first bore and second bore in each of the first and second support plates. The first and second bores extend in directions perpendicular to one another and are in communication with one another. A slug is placed in the first bore of the first and second support plates. The first and second threaded members are extended through the base plate and through one of the second bores of each of the first and second support plates respectively. The threaded members are then threaded into the slugs of the first and second support plates to attach the first and second support plates to the base plate.

The method of attachment of the support plates to the base plate can be utilized in other situations where two members are attached together. For example it can be used to attach the block to the upstanding members. It can also be utilized to attach the tightening member to the block for movement between the loose and tightened position.

DETAILED DESCRIPTION OF THE PREFERRED EMBODIMENT

Figure 1:
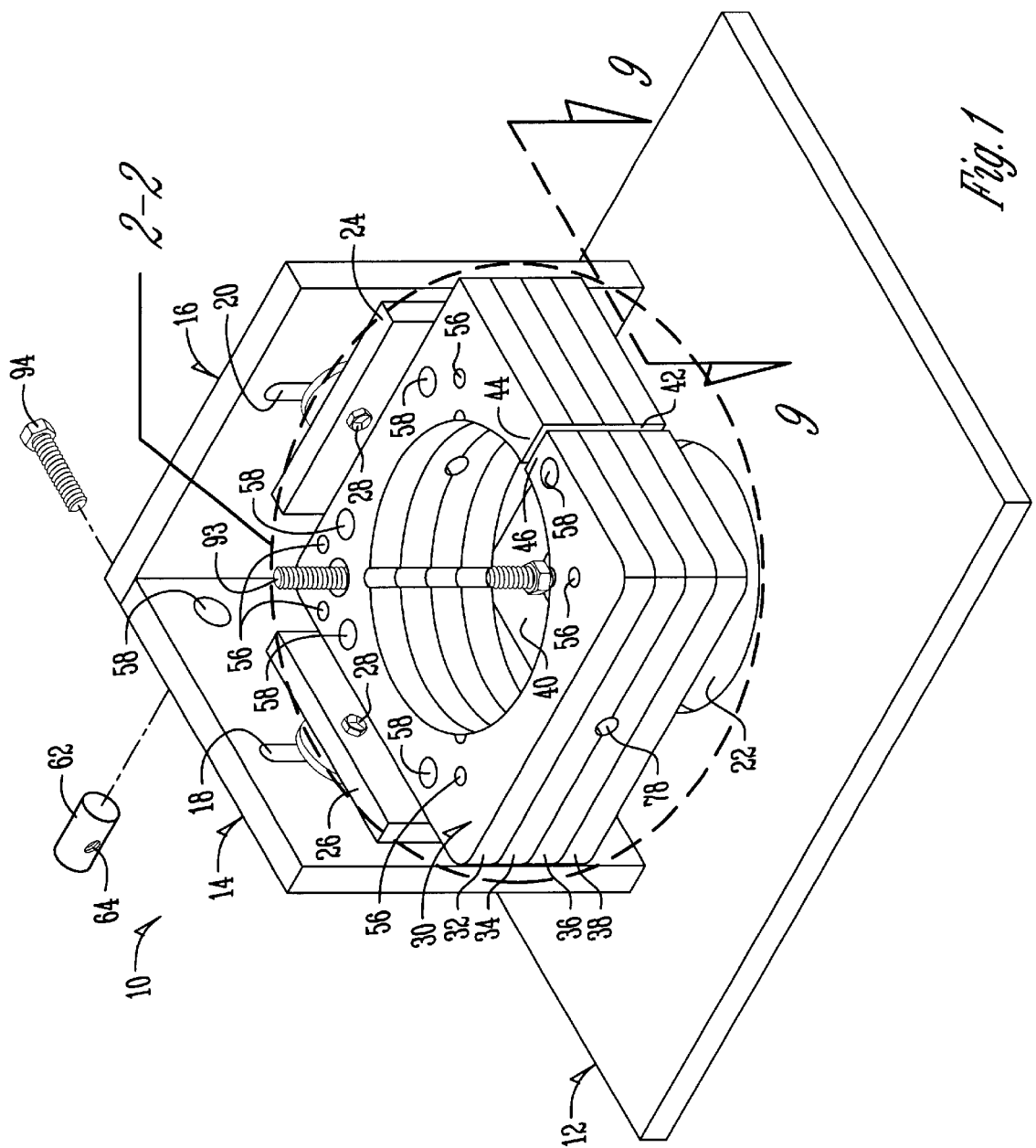
FIG. 1 is a perspective view of the holding device of the present invention.

Referring to the drawings, the numeral 10 generally designates the holding device. Device 10 includes a base plate 12, support plates 14, 16 which are attached to the base plate 12 and to each other at right angles, a pair of sliding plates 24, 26, and a holding block 30. Support plates 14, 16 are each provided with vertical grooves 18, 20 respectively. The base plate 12 is provided with a base plate opening 22. Bolts 28 extend through sliding plates 24, 26 and also through the vertical grooves 18, 20 to attach the sliding plates 28 to the upstanding support plates 14, 16. Bolts 28 can permit the sliding blocks 26, 28 to slide vertically so as to position the block 30 in the desired position. The block 30 is rigidly secured to the sliding plates 28 by means to be described hereinafter.

Figure 2:
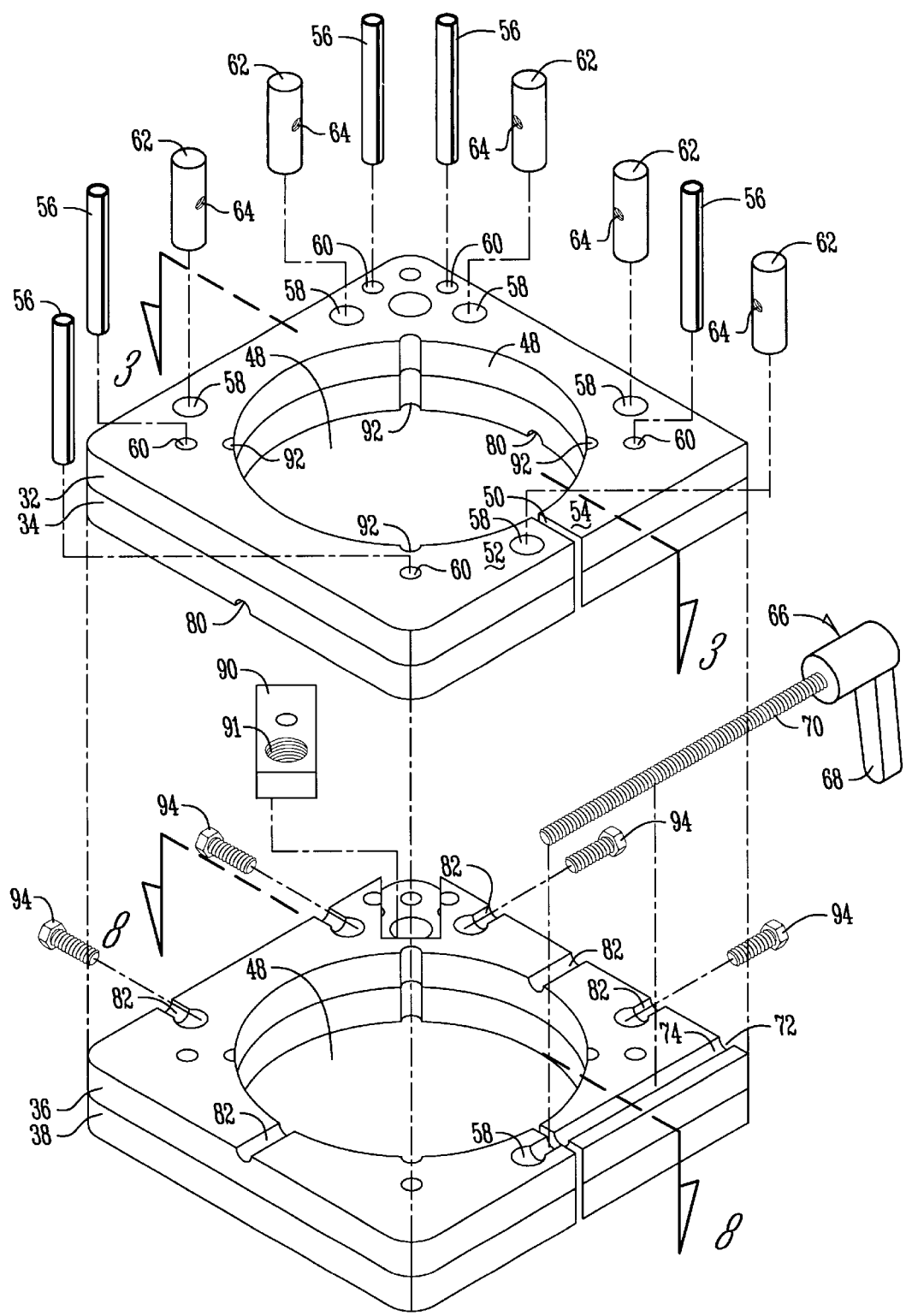
FIG. 2 is an exploded view of the laminates in the block shown in FIG. 1.
Figure 3:
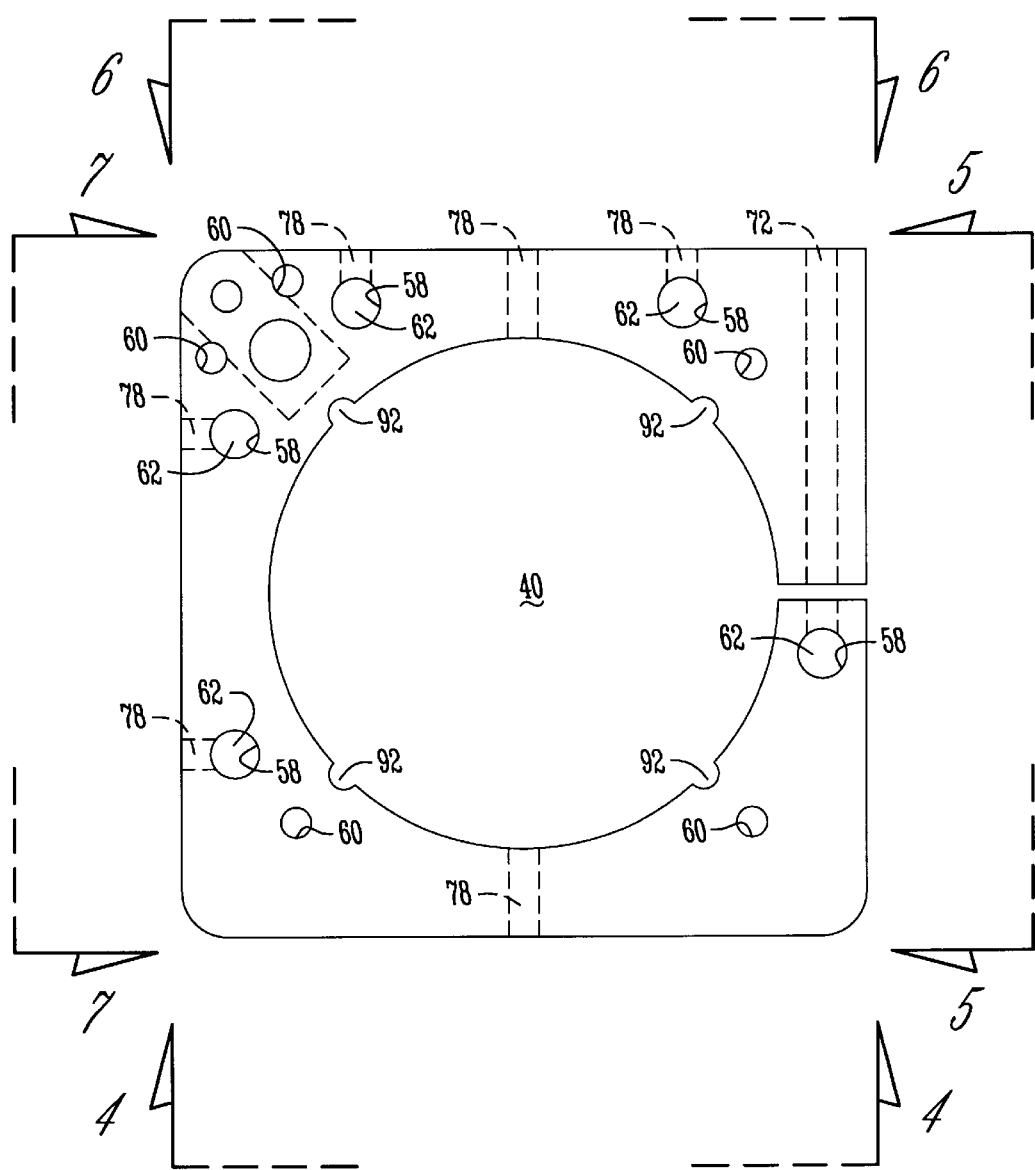
FIG. 3 is a top plan view of the block of FIG. 1.
Figure 4:
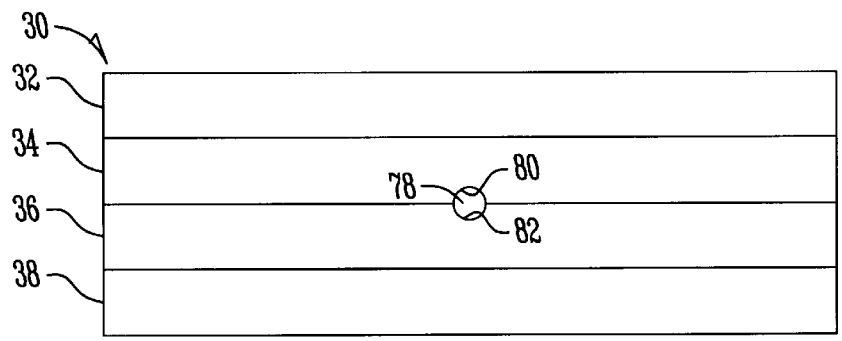
FIG. 4 is an elevational view taken along line 4—4 of FIG. 3.
Figure 5:
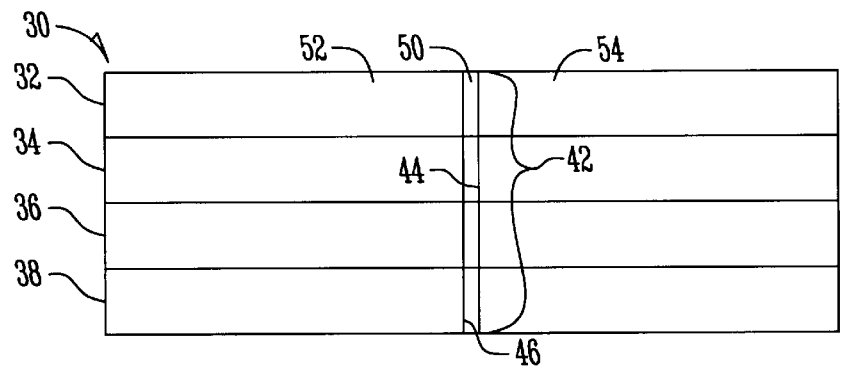
FIG. 5 is an elevational view taken along line 5—5 of FIG. 3.

Holding block 30 is comprised of four laminate layers 32, 34, 36, 38. While the number of laminates is shown to be four, this number may be increased or decreased without detracting from the invention. Each of the laminate members includes a laminate opening 48 (FIG. 2), a laminate slot 50, a laminate C-end 52 and a laminate C-end 54 spaced apart from one another across the laminate slot 50 (FIG. 2). The laminates 32, 34, 36, 38 are secured together by means of a plurality of fastening pins 56 which may be rivets, bolts, or other securing members. The laminates may be also attached by adhesives, by bonding, or by other means without detracting from the invention. When the laminates 32, 34, 36, 38 are joined together they create laminated holding block 30 which has a block opening 40 (FIG. 21), a block slot 42, and block slot C-ends 44, 46 which are spaced apart across the block slot 42. Numerals in FIG. 1 show the block in its assembled form, and the numerals in FIG. 2 show the numerals of the various components in the individual laminates.

Figure 6:
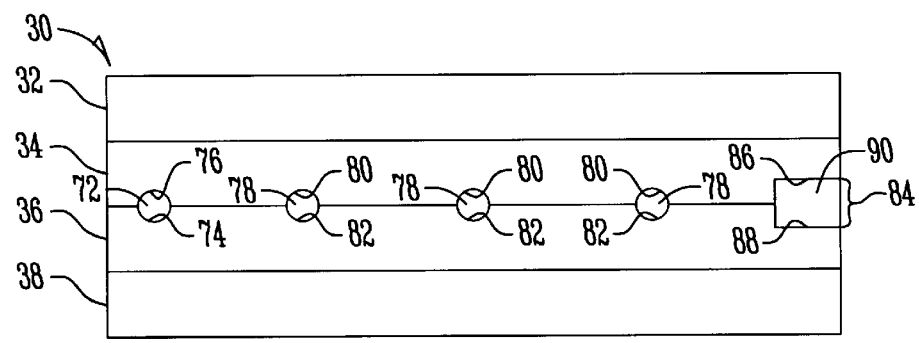
FIG. 6 is an elevational view taken along line 6—6 of FIG. 3.
Figure 7:
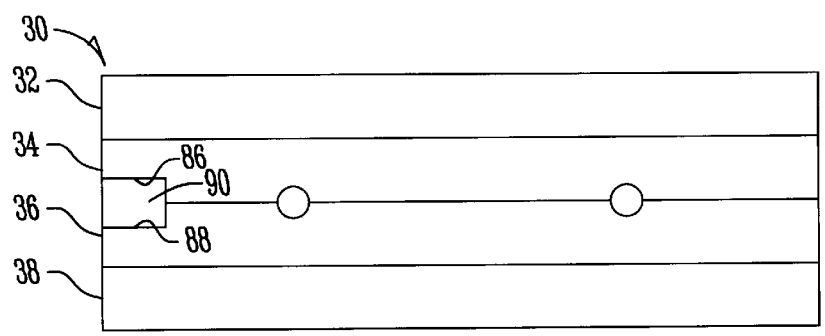
FIG. 7 is an elevational view taken along line 7—7 of FIG. 3.

Extending axially through block 30 in a direction parallel to the longitudinal axis of the central opening 40, are a plurality of axial slug holes 58 and a plurality of axial pin holes 60 (FIG. 2). The pin holes 60 receive pins 56 for attaching the laminates 32, 34, 36, 38 together. Axial holes 58 receive slugs 62 which have threaded openings 64 therein. A tightening member 66 comprises a handle 68 and a threaded shank 70. The threaded shank 70 is threaded into the threaded opening 64 of slug 62 within an axially extending slug bore 58. The shaft 70 also extends through a horizontal bore 72 which is formed of a first bore half 74 and a second bore half 76 (FIG. 6). Other horizontal bores 78 are provided in communication with the vertical or axially extending bores 60. These horizontal bores 78 are each formed of an upper bore half 80 formed in one of the laminates 32, 34, 36, 38 and a lower bore half 82 formed in the laminate immediately there below (FIG. 6).

Figure 8:
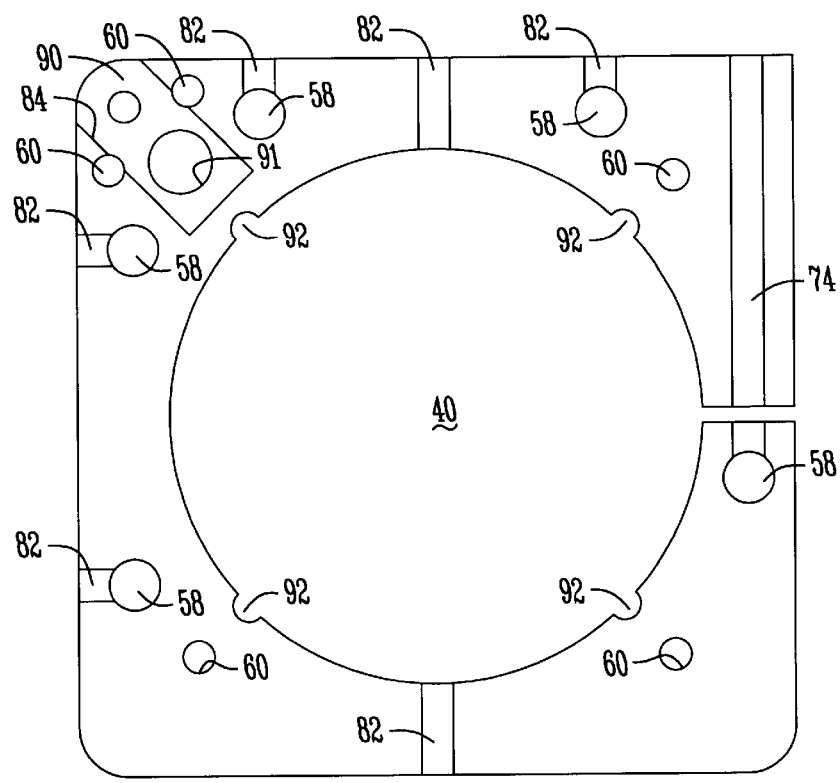
FIG. 8 is a top plan view taken along line 8—8 of FIG. 2.

A corner slot 84 (FIG. 8) is formed of an upper slot half 86 in one of the laminate members 32–38, and a lower slot half 88 formed in another of the laminates 32–38. A metal member 90 is provided with a threaded opening 91 for receiving an adjustment bolt 93 (FIG. 1).

Figure 9:
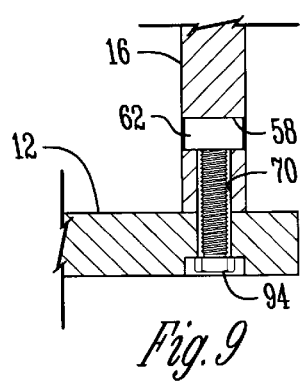
FIG. 9 is a sectional view taken along line 9—9 of FIG. 1.

Extending axially downwardly along the inside surface of the opening 40 are four semi circular grooves 92 which are adapted to accommodate the shape of the tool (not shown) being held. Bolts 94 extend through the horizontal slots 82 and are threaded within the openings 64 of slugs 62 so as to attach the block to the sliding plates 26, 28. Similarly, the keyhole arrangement of bores 70 and bores 58 are utilized to attach the vertical plates 14, 16 to the base plate 12 and also to connect the vertical support plates 14, 16 to one another (FIG. 9).

The present invention provides advantages over the prior art. The use of laminates 32, 34, 36, 38 permits the radial bores 72, 78 to be formed by machining out one half of the bore in one of the laminates 32, 34, 36, 38 and by machining out the opposite half bore in the adjacent laminate there above. The same method may be used for forming corner slot 84. This simplifies the forming of the radial bores 78 because the individual laminates can be milled out rather than the difficult task of boring the radial bores in the block after it is formed.

Another feature of the present invention that is important is the upstanding attachment of members 14, 16 together. By attaching these together at right angles and by also attaching them to the base plate 12, it is possible to obtain a much more firm and secure holding of the router or other tool. In the past, the plates 14, 16 were parallel to one another with the block 30 positioned between. The present invention of placing the plates 14, 16 at right angles to one another provides a much firmer and more secure holding of the block 30 and the device tool being held by the block 30. At the same time, the block 30 can be adjusted upwardly and downwardly by moving sliding blocks 26, 28 upwardly and downwardly.

Another feature of the present invention is the use of keyhole slots to attach the various members together. The keyhole slots include a first bore such as bore 58 having a slug 62 therein. A second bore 78 is at right angles to the first bore 58 and forms a keyhole configuration therewith. A threaded bolt such as bolts 94 can then be threaded through the two members and into the slugs so as to attach two members together.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstance may suggest or render expedient without departing from the spirit or scope of the invention as further defined in the following claims.

What is claimed is:

1. A holding device for selectively retentively holding an object, the holding device comprising:

a plurality of laminate members each having a first flat surface, a second flat surface parallel to the first flat surface, a parametric edge, a central opening extending through each of the laminate members in a direction perpendicular to the first and second flat surfaces, and a slot extending completely through the laminate member from the central opening to the parametric edge so as to create a first laminate side and a second laminate side spaced apart from one another across the slot;

securing means holding the plurality of laminate members together in a stack to form a laminated block having a central block opening formed by the central openings of the plurality of laminate members being registered with one another and having a block slot formed by the slots of the plurality of laminate members being registered with one another;

the block slot forming a first block side and a second block side spaced apart from one another across the block slot;

the central block opening having a shape and size that corresponds generally to the object so as to permit the object to be fitted within the block opening of the laminated block;

a tightening member engaging the first and second block sides and being movable to cause flexing of the laminated block from a loose position permitting the object to move within the registered openings of the laminated block to a tight position moving the opposite sides of the block stop closer together to clamp the laminated block around the object and hold the object against movement relative to the laminated block.

2. The holding device according to claim 1 wherein the laminated block comprises one or more axial holes extending perpendicular to the first and second flat surfaces of the plurality of laminate members.

3. The holding device according to claim 1 wherein the laminated block comprises one or more radial holes extending parallel to the first and second flat surfaces of the plurality of laminate members.

4. A holding device according to claim 3 wherein the one or more radial holes each comprise a first partial hole formed in one of the plurality of laminate members and second partial hole formed in another of the plurality of laminate members and registered with the first partial hole to combine to form a single one of the one or more radial holes.

5. A holding device according to claim 1 wherein the securing means comprises securing members interconnecting the plurality of laminate members.

6. A holding device according to claim 1 wherein the securing means comprises adhesive securing the plurality of laminate members together.

7. A holding device according to claim 1 wherein the securing means comprises bonds between the adjacent first and second surfaces of the plurality of laminate members holding the laminate members together in the laminated block.

8. A holding device according to claim 1 and further comprising a base plate and at least two support members attached to the base plate, a plurality of fastening members connecting the at least two support members to the laminated block.

9. A holding device according to claim 8 wherein the at least two support members comprise a first support plate lying in a first plane and a second support plate lying in a second plane perpendicular to the first plane, the first and second support plates contacting and being attached to one another to provide a rigid support structure for the laminated block.

10. A holding device according to claim 8 wherein the first and second support members each comprise a first bore and a second bore therein, the first and second bores being in communication with and perpendicular to one another, a slug being within the first bore, a threaded member extending through the base plate, through the second bore, and being threaded into the slug so as to attach each of the first and second support members to the base plate.

11. A holding device according to claim 10 wherein the first and second bores combine to form a keyhole shaped opening in each of the first and second support members.

12. In combination:

a router;

a laminated block having an opening extending through the laminated block and surrounding a portion of the router;

the laminated block having a radial slot extending from the opening in a radial direction and forming first and second separate sides of the laminated block on opposite sides of the radial slot;

a tightening member engaging the first and second separate sides of the laminated block and being movable from a loose position wherein the laminated block loosely surrounds the portion of the router to a tightened position wherein the first and second separate sides of the laminated block move toward one another and the block tightly clamps around the portion of the router;

the laminated block being formed from a plurality of laminate members, each comprising first and second opposite laminate faces, the plurality of laminate members being attached together in face to face relation to one another.

13. The combination according to claim 12 wherein the opening extends along an opening axis, the laminated block including one or more holes formed therein, the holes each having a hole axis extending in a plane perpendicular to the opening axis.

14. The combination according to claim 13 wherein each of the one or more holes comprises a first hole half formed in one of the plurality of laminate members and a second hole half formed in a second of the plurality of laminate members, the first hole half and the second hole half combining to form each of the one or more holes.

15. A combination according to claim 12 and further comprising a base plate, first and second support members attached to the base plate and the laminated block for holding the laminated block in a predetermined position relative to the base plate.

16. A combination according to claim 15 and further comprising a first securing hole and a second securing hole in each of the first and second support members, the first and second securing holes being perpendicular to one another and being in communication with one another, a slug being within the first securing hole, a threaded member extending through the base plate and the second securing hole and being threaded into the slug to attach the base plate to the support member.

17. A holding device for a router comprising:
  a holding block having an opening for receiving the router, the holding block having first and second spaced apart block ends on one side of the opening;
  a tightening member engaging the first and second block ends and being movable from a loose position to a tightened position flexing the first and second blocks toward one another to reduce the size of the opening;
  a base plate having a planar base plate surface;
  a first support plate lying in a first plane perpendicular to the planar base plate surface and having a first securing member attaching a first support plate edge to the base plate surface;
  a second support plate lying in a second plane perpendicular to the planar base plate surface and having a second securing member attaching a second support plate edge to the base plate surface;
  a third securing member attaching the first and second support plates to one another so that the first plane of the first support plate is perpendicular to the second plane of the second support member
  the holding block being operatively attached to both of the first and second support plates.

18. The holding device for a router according to claim 17 wherein the first and second support plates each have a first bore extending in a direction parallel to the planar base surface and a second bore communicating with the first bore and extending in a direction perpendicular to the planar base surface, a slug being fitted within the first bore, the first and second securing members each comprising a threaded member extending through the base plate and the second bore and being threaded into the slug for attaching the first and second support plates, respectively to the base plate.

19. The holding device for a router according to claim 17 wherein one of the first and second support plates includes a first bore therein and a second bore connected to and extending perpendicular to the first bore, a slug being fitted within the first bore, the third securing member comprising a threaded member extending through the other of the first and second support plates and the second bore, and being threaded within the slug to attach the first and second support plates together.

20. The holding device for a router according to claim 17 wherein the holding block is comprised of a plurality of laminate layers joined together to form the holding block.

21. The holding device for a router according to claim 17 wherein the opening includes an opening axis, at least one bore extending within the holding block in a direction perpendicular to the opening axis, the at least one bore comprising a first bore half in one of the laminate layers and a second bore half in another of the laminate layers, the first and second bore halves combining to form the at least one bore.

22. A method for assembling a holding device for a router comprising:
  forming a plurality of laminate plates, each having opposite faces, a parametric edge, a router opening extending there through along a router opening axis perpendicular to the first and second flat surfaces, and a slot extending from the router opening to the parametric edge to create a first laminate end and a second laminate end spaced across the slot from one another;
  attaching the plurality of laminate members together in face to face relation with one another and with the router openings and the slots of each of the laminate members registered with one another, respectively, thereby forming a laminated block having a block opening formed by the registered router openings, a block slot formed by the registered laminate slots, and first and second block ends spaced apart from one another across the block slot;
  engaging the first block end and the second block end with a tightening member capable of moving from a loose position to a tightened position flexing the first block end and the second block end towards one another to reduce the size of the block opening.

23. The method of claim 22 and further comprising attaching a first support plate and a second support plate to a base plate and attaching the first support plate to the second support plate at right angles to one another.

24. The method of claim 23 wherein the step of attaching the first and second support plates to a base plate comprises forming a first bore and a second bore in each of the first and second support plates, the first and second bores extending in directions perpendicular to one another and being in communication with one another; placing a slug in the first bore of each of the first and second support plates; extending first and second threaded members through the base plate and through one of the second bores of each of the first and second support plates respectively; and threading the first and second threaded members into the slugs of the first and second support plates respectively to attach the first and second support plates to the base plate.

25. The method of claim 23 wherein the step of attaching the first support plate to the second support plate comprises forming first and second bores in the first support plate, the first and second bores being in communication with one another and extending perpendicular to one another, fitting a slug within the first bore of the first support plate, extending a threaded member through the second support plate and the second bore of the first support plate, and threading the threaded member into the slug within the first bore of the first support plate to attach the first and second support plates together.

* * * * *